Nov. 16, 1937.   W. C. MacFADDEN   2,099,655
MOUNTING BRACKET AND INSTALLATION THEREOF.
Filed March 20, 1935
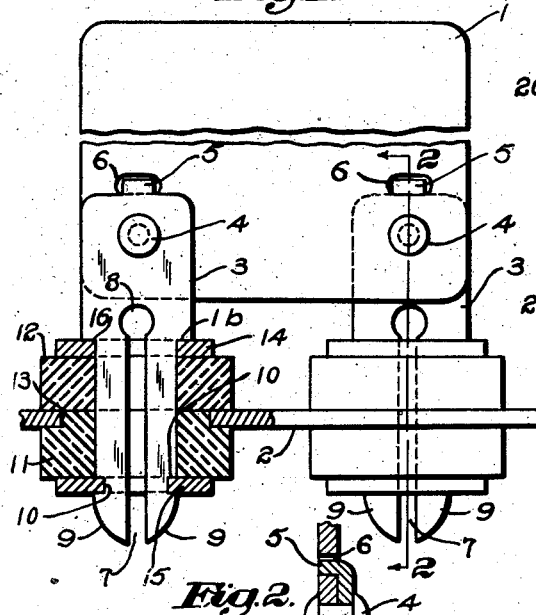
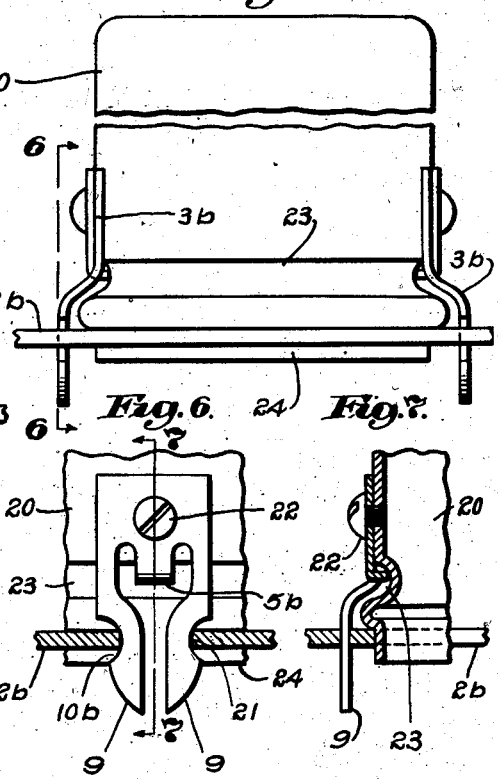
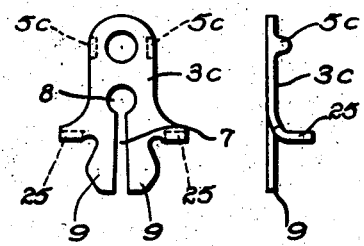
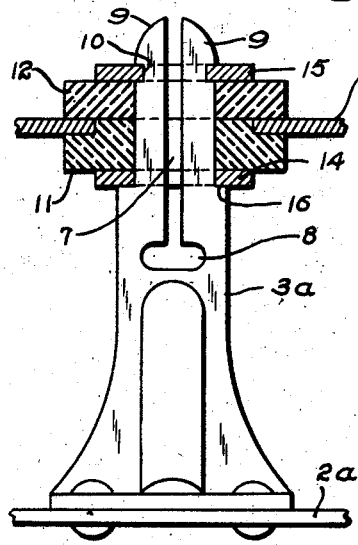
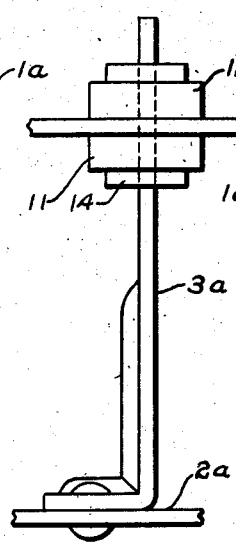
Inventor:
Wilford C. MacFadden
by Walter S. Jones
Att'y Patented Nov. 16, 1937

2,099,655

UNITED STATES PATENT OFFICE 2,099,655

MOUNTING BRACKET AND INSTALLATION THEREOF

Wilford C. MacFadden, Philadelphia, Pa., assignor to United-Carr Fastener Corporation, Cambridge, Mass., a corporation of Massachusetts Application March 20, 1935, Serial No. 12,114

7 Claims. (Cl. 248—358)

My invention aims to provide improvements in mounting brackets and their use in connection with mounting parts, such as electrical units of a radio set, to a support.

In the drawing, which illustrates preferred embodiments of my invention:—

Figure 1 is an elevational view, with a portion thereof in cross-section, of members representing the attachment of an end plate of a variable condenser to a supporting member;

Fig. 2 is a section taken on the line 2—2 of Figure 1 showing my improved mounting bracket;

Fig. 3 is a part section and part elevational view of a form of my invention showing substantially a reversal of the parts shown in Fig. 1 but with an L-shaped attaching bracket;

Fig. 4 is a side elevation of the part shown in Fig. 3;

Fig. 5 is an elevational view of another form of my invention showing the combination thereof in connection with the mounting of a container unit of a radio apparatus;

Fig. 6 is a section taken on the line 6—6 of Fig. 5;

Fig. 7 is a section taken on the line 7—7 of Fig. 6;

Fig. 8 is a front elevation of another form of mounting bracket; and

Fig. 9 is an edge view of the bracket shown in Fig. 8.

Heretofore it has been the practice to attach various electrical units to a supporting structure by the use of rivets, screws, bolts and the like. This method has its disadvantages inasmuch as many of the parts have to be removed for repair or replacement and it is a difficult and tedious job, especially when rivets and bolts are used. Screws are not particularly satisfactory, because they may jar loose. In order to facilitate mounting and removal of parts, I have invented various novel so-called mounting brackets which may be permanently connected to one of the parts to be assembled and detachably connected to another part as by the provision of snap fastening means which may be interlocked against removal by manipulation except after the snap fastener part has been contracted or the snap fastener part may be so constructed that it can be engaged and disengaged by axial push or pull.

Referring first to the embodiment of my invention illustrated by Figs. 1 and 2, I have shown a mounting means for an end plate 1 of a variable condenser or other similar device. The particular structure shown illustrates the plate 1 as being attached to a support 2 by means of a special bracket adapted to be attached to one of the parts by a snap fastening means.

The bracket 3 is formed from flat sheet metal and has one end rigidly attached to the plate 1 as by a rivet 4 (Fig. 2) and is held against rotation about the axis of the rivet by a lug 5 formed integral with the bracket and extending normal to the plane thereof into a small aperture 6 in the plate 1. The opposite end of the bracket 3 is divided by a slot 7 extending from the free end and terminating in an enlargement 8 of the slot. Thus at each side of the slot 7 I have provided a yieldable portion 9 having a notch 10 in its outer edge at a predetermined distance from the free end. The outer edge of each yieldable portion 9 preferably converges toward the free end from the notch 10 thereby providing cam means to force the portions 9 toward each other when being forced through an aperture as hereinafter described.

While the yieldable portion of the bracket may be engaged directly with the support 2 where it is desirable to ground the plate 1 through the support 2, I have found that in some instances it is desirable to insulate these two parts from each other. This may be accomplished in any suitable manner but I prefer to use two insulating pieces 11 and 12 which are assembled with the support 2 and the bracket 3 in about the manner shown in Figs. 1 and 2. A portion of the piece 11 extends into a hole 13 in the support 2 and the yieldable portions 9—9 of the bracket pass through apertures in the pieces 11 and 12. To hold the parts in assembly I use two metal washers 14 and 15. The washer 14 rests on one end of the insulating piece 12 and shoulders 16—16, on the bracket, in turn rest against the washer 14. The washer 15 rests against one end of the insulating piece 11 and engages the notches 10—10 in the yieldable portions 9—9 of the bracket 3, as shown in Fig. 1. The aperture through the washer 15 is small enough so that the tapered ends of the portions 9—9 must move toward each other as they are forced through and thus the snap fastener part acts to complete assembly of the parts by a direct axial push and the parts are firmly secured together. With the particular shape of notches 10—10 the parts are locked together and may be separated only by squeezing together the ends of the portions 9—9.

In Fig. 1 I have shown two of these bracket installations for holding the plate 1 but it should be understood that any number may be used, depending upon the part to be supported.

The embodiment of my invention shown in Figs. 3 and 4 is substantially the same as shown in Figs. 1 and 2 with the exception that the bracket 3ª is L-shaped at the attaching end and this installation may be assumed to be the reverse of that shown in Figs. 1 and 2 inasmuch as the bracket is rigidly attached to the support 2ª and the snap fastener portion is assembled with the part 1ª to be supported. Otherwise the parts are substantially the same as the corresponding parts shown in Figs. 1 and 2 and bear the same identifying numerals.

Referring now to the structure shown by Figs. 5, 6, and 7, I have shown my invention in connection with attaching a unit 20 to a supporting structure, which unit may be a radio frequency transformer, a coil cover or some such similar device and in this instance, if the cover is of metal, it may be directly grounded through the brackets 3b attached to opposite sides thereof. In this case the bracket is provided with curved notches 10b for engagement with the support 2b so that the device may be secured to the support by a direct axial push which forces the snap fastener ends of the brackets 3b through the apertures 21 in the support 2b. Since the notches 10b are curved the unit 20 may be removed by a direct axial pull.

In this particular installation the brackets 3b are attached to the unit 20 by screws 22 (Figs. 6 and 7) and the lugs 5b are taken from material between the yieldable portions 9—9 adjacent to where the yieldable portions connect with the attaching portion of the bracket so that they may engage a groove 23 formed in the unit 20 as a part thereof.

This particular type of unit 20 has its lower end portion 24 passing through an aperture in the support 2b in the customary manner and for the purposes well known to those skilled in the art.

In Figs. 8 and 9 I have shown another form of bracket 3c which is somewhat similar to the type shown and described in connection with Figs. 5, 6, and 7. This device is provided with a pair of lugs 5c at opposite sides thereof (Fig. 8) which serve the same purpose as the lugs 5 and 5b. In addition this bracket 3c is provided with a pair of wing portions 25—25 extending at right angles from the plane of the bracket and adjacent to the yieldable portions 9—9 to provide substantial bearing portions which may act as supports to engage one face of a supporting structure and are particularly useful where they are the only means engaging the supporting structure at that face of the support that they contact.

While I have illustrated and described several preferred embodiments of my invention, it should be understood that various changes may be made both in the construction of the brackets and their modes of assembly with parts without departing from the spirit of my invention which is best defined by the following claims.

I claim:

1. The combination with a support of an electrical part of the class described and a fastening bracket in the form of a finger-like member having one end rigidly attached to said part by a rivet and the like, a lug extending from said bracket into engagement with said part to prevent rotation about the axis of said rivet and the like and said bracket having its other end divided into yieldable fingers providing readily attachable and detachable means for cooperation with said support, said fingers constituting snap fastener members and being formed on their outer faces with notches to engage said support and secure said electrical parts thereto against relative movement laterally and vertically.

2. The combination of parts of electrical apparatus, such as a radio set, of a support, a unit of the apparatus, a rubber bushing in a hole in said support, a bracket having one end rigidly attached to said unit, a yieldable snap fastener shaped end of said bracket passing through an aperture in said bushing and a washer engaging said snap fastener end to secure the parts together.

3. The combination of parts of electrical apparatus, such as a radio set, of a support, a unit of the apparatus, a two-piece rubber bushing in a hole in said support, a bracket having one end rigidly attached to said unit, a yieldable snap fastener shaped end of said bracket passing through an aperture in said bushing and a washer engaging said snap fastener end to secure the parts together.

4. The combination of parts of electrical apparatus, such as a radio set, of a support, a unit of the apparatus, a two-piece rubber bushing in a hole in said support, a bracket having one end rigidly attached to said unit, a yieldable snap fastener shaped end of said bracket passing through an aperture in said bushing and a metal washer at each end of said bushing engaging said snap fastener end and cooperating therewith to hold the parts in assembly.

5. A mounting bracket of the class described formed to provide a relatively flat member having one end shaped and arranged for rigid attachment to a member, a pair of lugs adjacent to the edges of that end and for the purposes described, the other end being divided longitudinally of the bracket to provide yieldable portions, said yieldable portions having oppositely disposed similarly shaped notches in their outer edges to make snap fastening engagement with a support when said edges are moved toward each other, and a pair of wing portions integral with said yieldable portions and located adjacent to said notches, said wing portions extending at right angles from said yieldable portions to engage one face of said support.

6. The combination with an apertured support of an electrical part of the class described, and a one-piece snap fastening bracket securing said part to said support, a rivet or the like for securing one portion of the bracket to said electrical part, another portion of said bracket being divided into expansible and contractible fingers adapted to engage the aperture of said support with a snap fastener action and to be detached therefrom by an axial pull, said fingers being formed on their outer edges with notches to engage said support, thereby securing said unit in detachable engagement from said support.

7. A one-piece fastening bracket for mounting an electrical part on an apertured support, said bracket comprising an elongated finger-like member, one end of said member being flat and apertured to receive a rivet or the like for attaching said end to the outer face of said electrical part and the other end of said bracket being divided into a pair of contractible and expansible fingers adapted to pass through an aperture in the support and having notches in their outer edges to engage said support and secure said electrical part to said support against accidental displacement therefrom, said fingers being disposed in a plane substantially parallel to said flat attaching portion.

WILFORD C. MacFADDEN.